3,100,227
PREPARATION OF CHLOROACROLEIN
Keith M. Taylor, Dickinson, Tex., assignor to Monsanto Chemical Company, St. Louis, Mo., a corporation of Delaware
No Drawing. Filed Mar. 16, 1961, Ser. No. 96,100
2 Claims. (Cl. 260—601)

The present invention relates to a process for preparing chloroacrolein and particularly α-chloroacrolein.

The known process for the production of chloroacrolein by chlorinating acrolein and subsequently recovering hydrochloric acid either by treatment with sodium acetate or by steam distillation suffers from certain drawbacks. The yield of chloroacrolein is low and the other reaction products are of little value. Accordingly, it is a primary object of the present invention to provide a simple, one-step process for chlorinating acrolein which gives high yields of chloroacrolein unaccompanied by non-useful by-products. Other objects and advantages of the invention will become apparent from the following description thereof.

According to the invention, chloroacrolein is produced by passing acrolein mixed with chlorine in mole proportions in the range from about 1:1 to about 3:1, the mixture being diluted with approximately 50% by volume of an inert gas, through a reaction zone heated to a temperature from about 75° C. to about 350° C. at a rate such that the residence time of the gases in the reaction zone is in the range from about 0.05 second to about 5 seconds.

The invention is illustrated in the following example which, however, is not to be construed as limiting it in any manner whatsoever.

EXAMPLE 1

A series of runs was made in which acrolein was reacted in the vapor phase directly with chlorine. The reactor employed was a quartz tube 0.08 cm. in outside diameter and of a length selected to give the desired reaction time. Heat to the reactor was supplied by means of an electrical furnace and reaction zone temperature was determined by means of a thermocouple inserted in a 3-mm. O.D. quartz tube centered in the reactor. Acrolein was fed from a pressurized reservoir through a rotameter into an electrically heated vaporizer and then into a line where it was premixed with chlorine in the desired mole proportions and with nitrogen in an amount approximately 50% by volume of the mixed gases. The gas mixture was then passed through the heated reactor at a rate to give the desired average residence time in the reaction zone. The effluent gases were condensed by passing them consecutively through a series of brine-cooled condensers and several Dry Ice traps. Non-condensed gases were vented to the atmosphere. The condensed products were combined, weighed and then analyzed by means of a Perkin-Elmer Model 154 gas chromatograph equipped with a printing integrator. Identification of the major reaction products as α-chloroacrolein, β-chloroacrolein and chloroacrylyl chloride was further verified by both infrared and mass spectrometric analyses of the condensate. Results of the runs made together with the conditions under which they were obtained are presented in Table I below.

*Table I*

| Run No. | Charged, moles/hr. | | Temp., °C. | Residence time, sec. | Conversion of acrolein | Yields (based on acrolein) | | |
|---|---|---|---|---|---|---|---|---|
| | Acrolein | Cl₂ | | | | α-Chloroacrolein | β-Chloroacrolein | Chloroacrylyl chloride |
| 1 | 1.5 | 1.5 | 75 | 3.0 | 67.6 | 62.1 | 37.4 | 0.5 |
| 2 | 1.6 | 1.4 | 100 | 3.0 | 66.1 | 51.5 | 45.5 | 3.0 |
| 3 | 1.4 | 1.3 | 150 | 3.0 | 75.9 | 79.4 | 11.7 | 8.9 |
| 4 | 1.3 | 1.1 | 200 | 3.0 | 74.4 | 45.5 | 54.2 | 0.3 |
| 6 | 1.14 | 1.8 | 100 | 3.0 | 87.3 | 70.0 | 20.9 | 9.1 |
| 7 | 1.06 | 1.67 | 150 | 3.0 | 89.7 | 91.4 | 8.5 | 0.1 |
| 9 | 1.9 | 1.9 | 150 | 0.1 | 79.7 | 81.6 | 8.7 | 9.7 |
| 10 | 1.75 | 1.75 | 200 | 0.1 | 78.4 | 77.3 | 8.4 | 14.3 |

The foregoing data demonstrate that excellent yields of chloroacrolein can be obtained by direct thermal chlorination of acrolein. Further, they indicate that by proper control of conditions the yield of α-chloroacrolein can be maximized.

Some variation in conditions from those exemplified can be made without departing from the scope of the invention. The reaction can be conducted, for example, at temperatures below 75° C. but yields are impractically low. However, the upper level of the temperature range can be extended to about 350° C. without seriously affecting the practicality of the process. Preferred temperatures lie in the range from about 100° C. to about 200° C.

While the reaction is preferably carried out with molar proportions of chlorine to acrolein of 1:1 to 2:1, molar proportions anywhere within the range from 1:3 to 3:1 are suitable.

Likewise, although average residence times from 0.05 second to 5 seconds can be employed, preferred residence times for the reaction are those from 0.1 second to about three seconds. A diluent gas is desirable in the reaction but not essential. When one is used, amounts up to about 50% by volume of the reaction gas mixture are usually employed. Inert gases other than nitrogen which are suitable include argon, helium, carbon dioxide and the like.

What is claimed is:
1. A process for the preparation of chloroacrolein which comprises reacting acrolein and chlorine in mole proportions from about 1:2 to about 2:1 in a reaction zone heated to a temperature within the range from about 100° C. to about 200° C., said gaseous mixture of acrolein and chlorine being diluted with an inert gas in proportions up to about 50% by volume and the residence time of the reacting gas mixture in the reaction zone being maintained in the range from about 0.1 second to about 3 seconds.

2. A process for the preparation of α-chloroacrolein which comprises passing acrolein and chlorine in mole proportions of about 1.0 to 1.5 through a reaction zone heated to a temperature of about 150° C. at a rate such that the residence time of the reacting gas mixture in said reaction zone is about 3 seconds, said gaseous mixture of acrolein and chlorine being diluted with about 50% by volume of nitrogen.

References Cited in the file of this patent

UNITED STATES PATENTS 2,490,386 Tess et al. _____ Dec. 6, 1949
2,815,385 Guest et al. _____ Dec. 3, 1957